United States Patent Office 3,704,314
Patented Nov. 28, 1972

3,704,314
(1-OXO-2-ALKYLIDENEINDANYLOXY) AND
(1-OXO - 2 - ALKYLIDENEINDANYLTHIO)
ALKANOIC ACIDS
Edward J. Cragoe, Jr., Lansdale, and Otto W. Woltersdorf, Jr., Chalfont, Pa., assignors to Merck & Co., Inc., Rahway, N.J.
No Drawing. Filed Nov. 25, 1968, Ser. No. 778,840
Int. Cl. C07c 69/26
U.S. Cl. 260—520                    11 Claims

ABSTRACT OF THE DISCLOSURE (1 - oxo - 2-alkylideneindanyloxy) and (1-oxo-2-alkylideneindanylthio)alkanoic acid products and salts, esters and amide derivatives thereof wherein the 1-oxo-2-alkylideneindanyl ring may be substituted by various radicals are disclosed. The products may be prepared by four routes: (1) via the dehydrohalogenation of a [1-oxo-2-halo-2-alkylindanyloxy (or thio)]alkanoic acid; (2) via the hydrolysis of a [1-oxo-2-alkylideneindanyloxy (or thio)]alkanoic acid ester; (3) via the etherification of a hydroxy (or mercapto)-2-alkylidene-1-indanone, or (4) when the alkylidene moiety is methylene, via the Mannich reaction by treating a [1-oxoindanyloxy (or thio)] alkanoic acid with a salt of a secondary amine in the presence of formaldehyde or paraformaldehyde followed by treatment of the Mannich intermediate with a weak base. The products thus obtained are diuretics and saluretics useful in the treatment of edema and hypertension.

This invention relates to a new class of chemical compounds which can be described generally as (1-oxo-2-alkylideneindanyloxy)alkanoic acids and (1-oxo-2-alkylideneindanylthio)alkanoic acids and to the non-toxic, pharmacologically acceptable salts, esters and amide derivatives thereof. It is also an object of this invention to describe novel methods for the preparation of the (1-oxo-2-alkylideneindanyloxy)alkanoic acids and (1-oxo-2-alkylideneindanylthio)alkanoic acids. Pharmacological studies show that the instant products are effective diuretic and saluretic agents which can be used in the treatment of conditions associated with electrolyte and fluid retention and hypertension.

When administered in therapeutic dosages, in conventional vehicles, the instant products effectively reduce the amount of sodium and chloride ions in the body, lower dangerous excesses of fluid levels to acceptable levels and, in general, alleviate conditions usually associated with edema.

The (1-oxo-2-alkylideneindanyloxy)alkanoic acids and (1-oxo-2-alkylideneindanylthio)alkanoic acids of the invention are compounds having the following structural formula:

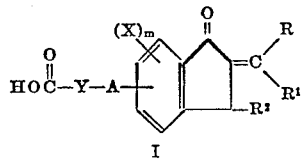

wherein A is oxygen or sulfur; R is hydrogen or lower alkyl; $R^1$ is hydrogen, lower alkyl such as methyl, ethyl, n-propyl, isopropyl, n-butyl, and the like; mononuclear aryl such as phenyl and the like; halo-substituted mononuclear aryl, for example, 4-halophenyl such as 4-chlorophenyl and the like; and trifluoro substituted lower alkyl such as trifluoromethyl and the like or R and $R^1$, taken together with the carbon to which they are attached, may be joined to form a cycloalkylidene ring, for example a six-membered cycloalkylidene ring such as cyclohexylidene and the like; $R^2$ is hydrogen or lower alkyl, for example, methyl, ethyl and the like; Y is an alkylene or haloalkylene radical having a maximum of 4 carbon atoms and which contain from 1 to 3 linear carbon atoms between the carboxy and oxy or thio moieties embraced by the definition of A, as, for example, methylene, ethylene, propylidene, isopropylidene, isobutylidene, fluoromethylene and the like; the X radicals are similar or dissimilar members selected from hydrogen, halogen such as fluoro, bromo, chloro, iodo and the like; lower alkyl such as methyl, ethyl, n-propyl, isopropyl, n-butyl and the like; trihalomethyl such as trifluoromethyl and the like; acylamino for example, lower alkanoylamino such as acetylamino and the like and, taken together, two X radicals on adjacent carbon atoms of the benzene ring may be joined to form an hydrocarbylene chain (i.e., a divalent organic radical composed solely of carbon and hydrogen) containing from 3 to 4 carbon atoms between their points of attachment, for example, trimethylene, tetramethylene, 1,3-butadienylene (i.e.,

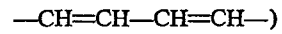
—CH=CH—CH=CH—)

and the like and m is an integer having a value of 1 to 3.

A preferred embodiment of this invention relates to (1-oxo-2-alkylidene-5-indanyloxy)acetic acids having the following structural formula:

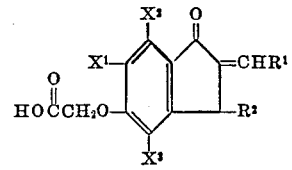

wherein $R^1$ is hydrogen or lower alkyl, $R^2$ is hydrogen or lower alkyl and $X^1$, $X^2$ and $X^3$ represent similar or dissimilar members selected from hydrogen, halogen, lower alkyl or, taken together, $X^1$ and $X^2$ may be joined to form a 1,3-butadienylene linkage (i.e.,

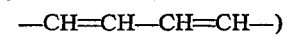
—CH=CH—CH=CH—)

and to the non-toxic, pharmacologically acceptable salts, esters and amide derivatives thereof. The foregoing class of compounds exhibits particularly good diuretic and saluretic activity and represents a preferred subgroup of compounds within the scope of this invention.

The [1 - oxo - 2 - alkylideneindanyloxy (and thio)]alkanoic acids (I) of this invention are conveniently prepared by one or more of four alternate processes. One such method of preparation comprises the dehydrohalogenation of a [1-oxo-2-haloindanyloxy-(or thio)]alkanoic acid; a second method comprises the hydrolysis of a [1-oxo-2-alkylideneindanyloxy (or thio)]alkanoic acid ester; a third method consists of the etherification of a hydroxy (or mercapto) - 2 - alkylidene-1-indanone, and a fourth method proceeds via the Mannich reaction by treating a [1-oxoindanyloxy (or thio)]alkanoic acid with a salt of a secondary amine in the presence of formaldehyde or paraformaldehyde followed by treatment of the resulting Mannich intermediate with a weak base.

The first of the above-mentioned processes, i.e., the dehydrohalogenation process, relates specifically to the reaction of a [1-oxo-2-haloindanyloxy (or thio)]alkanoic acid (II, infra) with a dehydrohalogenating agent as, for example, with an inorganic salt and, preferably, an inorganic salt containing lithium such as lithium bromide, lithium chloride and the like. The reaction is usually conducted in a diluent which is substantially inert to the reactants such as dimethyl sulfoxide, dimethylformamide and the like. The reaction may be conducted at a temperature of from about 50° to about 150° C. for a period of from about 1 to about 8 hours; however, in most instances, the reaction is conveniently carried out at steam bath temperatures for a period of about two hours. The following equation illustrates this reaction:

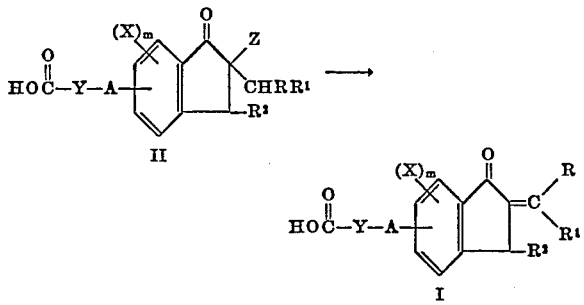

wherein A, R, $R^1$, $R^2$, X, Y and $m$ are defined above and Z is halogen such as bromo, chloro and the like.

A second method for preparing the products of this invention consists in the hydrolysis of an ester of an appropriate [1-oxo-2-alkylideneindanyloxy (or thio)]alkanoic acid (III, infra). The hydrolysis is conducted by treating said ester (III) with an acid as, for example, with hydrochloric acid in an acetic acid solution or, alternatively, by treatment with a base such as, for example, with an aqueous solution of sodium bicarbonate or an alcoholic solution of sodium hydroxide; however, when the hydrolysis is conducted with a base, it is necessary to treat the carboxylate salt intermediate thus formed with an acid to obtain the desired product. The following equation illustrates this method of preparation:

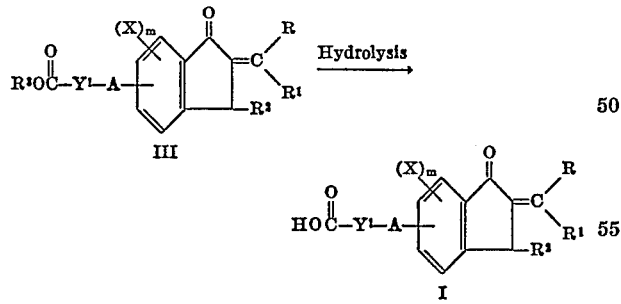

wherein A, R, $R^1$, $R^2$, $m$ and X are as defined above and $R^3$ is alkyl, for example, lower alkyl such as methyl, ethyl, n-propyl, n-butyl and the like and $Y^1$ is a methylene or trimethylene radical which may be appropriately substituted by alkyl or fluoro radicals.

The third method by which the products of this invention may be prepared comprises treating an hydroxy (or mercapto)-2-alkylidene-1-indanone (IV, infra) with a halo alkanoic acid of the formula: Z—$Y^1$—COOM, wherein $Y^1$ is as defined above and M is hydrogen or a cation derived from an alkali metal hydroxide or alkali metal carbonate, such as a sodium or potassium ion and Z is a defined above, followed by treatment of the alkali metal [1-oxo-2-alkylideneindanyloxy (or thio)]alkanoate compound thus obtained with an acid such as hydrochloric acid and the like to yield the desired product. The etherification is conducted in a di-lower alkyl ketone, such as acetone and the like and in the presence of a base such as potassium carbonate and the like. While the temperature at which the reaction is conducted is not critical, it is most desirable to conduct the process at the reflux temperature of the particular solvent being used. The following equation illustrates this process:

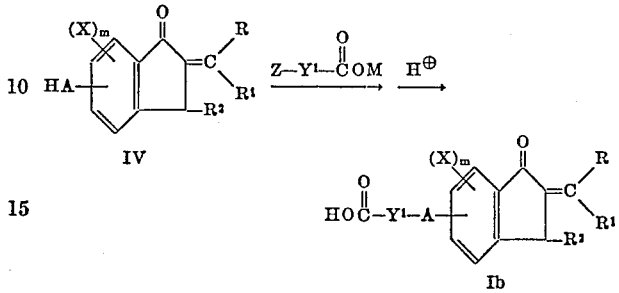

wherein A, R, $R^1$, $R^2$, M $m$, X, $Y^1$ and Z are as defined above.

It will be noted that inasmuch as the definition of the $Y^1$ radical is limited solely to methylene or trimethylene which may be substituted by alkyl or fluoro, the [1-oxo-2-alkylideneindanyloxy (or thio)]alkanoic acids produced by either the second or third process contain either a single carbon atom, or, three linear carbon atoms between the carboxy and oxygen (or sulfur) moieties of the product (I or Ib).

A fourth method of preparation and one which is used to prepare those products in which both R and $R^1$ in Formula I, supra, represent hydrogen, i.e., the [1-oxo-2-methyleneindanyloxy (or thiol)]alkanoic acid products (Ic, infra) involves the Mannich reaction. This method of preparation comprises treating a [1-oxoindanyloxy (or thio)]alkanoic acid (V, infra) with an appropriate secondary amine salt in the presence of formaldehyde or paraformaldehyde to form a salt of the corresponding Mannich base (VI, infra), followed by treatment of the said Mannich intermediate with a weak base such as sodium bicarbonate, either with or without heat or, alternatively, with heat alone, to afford the desired [1-oxo-2-methyleneindanyloxy (or thio)]alkanoic acid (Ic, infra). The following equation illustrates the process:

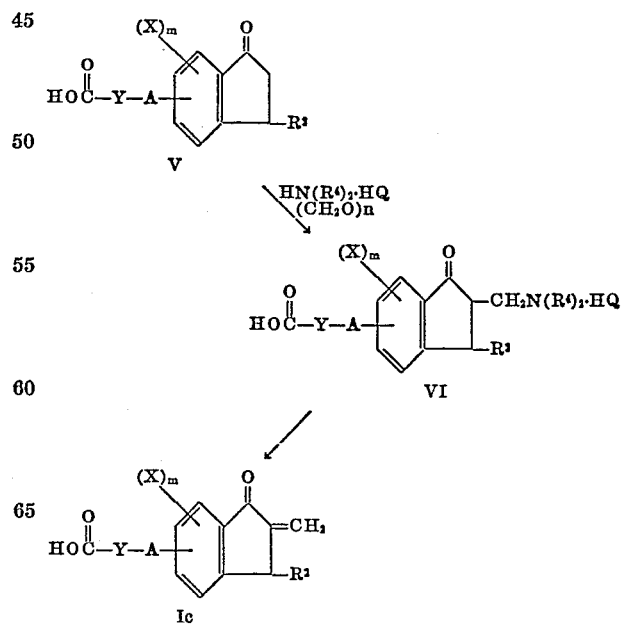

wherein A, $R^2$, $m$, X and Y are as defined above and $R^4$ is lower alkyl or both $R^4$ radicals, taken together with the nitrogen atom to which they are attached may be joined to form an heterocyclic amine such as piperidine, morpholine and the like; $n$ is an integer having a value of one or more and $HN(R^4)_2 \cdot HQ$ is a secondary amine salt such as a di-lower-alkylamine salt, piperidine salt, a morpholine salt and the like, and HQ is an organic or inorganic acid capable of forming salts with amines, as for example, hydrochloric acid and the like.

The [1-oxo-2-haloindanyloxy (or thio)]alkanoic acids (II, infra) employed as starting materials in the above-mentioned dehydrohalogenation process are themselves diuretically active compounds and may be prepared by the halogenation of an appropriate [1-oxoindanyloxy (or thio)]alkanoic acid (VII, infra) with a halogenating agent such as bromine, chlorine and the like. In this regard, when bromine is the halogenating agent employed, it has been found most beneficial to add a trace of 48% hydrobromic acid to initiate the reaction. In general, any solvent which is substantially inert with respect to the reactants employed and in which the reagents are reasonably soluble may be used. Solvents which have proved to be particularly advantageous include acetic acid, chloroform, dioxane, diethyl ether, methylene chloride and the like. The reaction may be conducted at temperatures of from about 0° to 50° C. but, generally, it is most convenient to conduct the process at ambient temperature. The following equation illustrates this process:

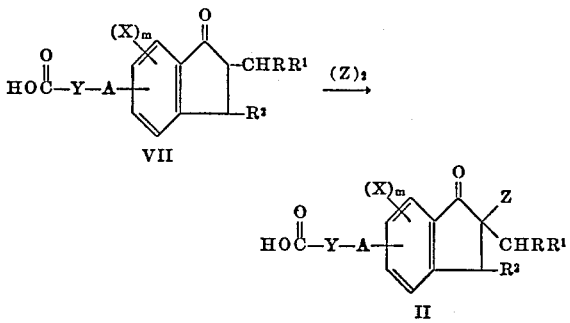

wherein A, R, $R^1$, $R^2$, m, X, Y and Z are as defined above.

The [1-oxo-2-alkylideneindanyloxy (or thio)]alkanoic acid esters (III) which are described above in connection with the second method for preparing the instant products (I) also exhibit a dual utility inasmuch as they are useful not only as chemical intermediates, but are themselves active as diuretics. The said esters may be prepared by various methods including: (a) the etherification of an hydroxy (or mercapto)-2-alkylidene-1-indanone (IV) with a suitable haloalkanoic acid ester; or (b) via the condensation of an ester of a [1-oxoindanyloxy (or thio)] alkanoic acid with an aldehyde.

The etherification method (a) for preparing the [1-oxo-2-alkylideneindanyloxy (or thio)]alkanoic acid ester derivatives (III) comprises reacting a halo alkanoic acid ester of the formula:

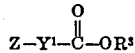

wherein $R^3$, $Y^1$ and Z are as defined above, with a suitable hydroxy (or mercapto)-2-alkylidene-1-indanone (IV, infra). The following equation illustrates this reaction:

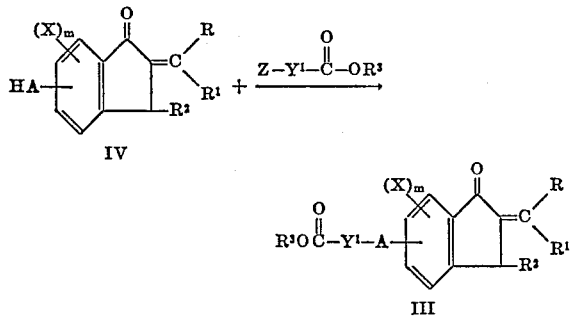

wherein A, R, $R^1$, $R^2$, $R^3$, Y, m and Z are as defined above.

Also, it will be noted that inasmuch as the definition of the $Y^1$ is limited solely to methylene or trimethylene, which may be substituted by alkyl or fluoro, the [1-oxo-2-alkylideneindanyloxy (or thio)]alkanoic acid esters produced by this process contain only a single carbon atom or, alternatively, three linear carbon atoms between the carbonyl and oxygen (or thio) groups of the ester derivatives. In general, the reaction is conducted in the presence of a base such as potassium or sodium carbonate or potassium or sodium hydroxide or in the presence of a sodium alkoxide such as sodium ethoxide. The choice of a suitable reaction solvent is largely dependent upon the character of the reactants employed but, in general, any solvent which is substantially inert to the reactants and in which the reagents are reasonably soluble may be used; ethanol and dimethylformamide, for example, have proved to be particularly advantageous solvents in which to conduct the reaction. The process may be carried out at ambient temperatures but, generally, it is desirable to conduct the process at a temperature above ambient temperatures.

The condensation process (b) for preparing the [1-oxo-2-alkylideneindanyloxy (or thio)]alkanoic acid ester derivatives (IIIb) involves the reaction of a [1-oxoindanyloxy (or thio)]alkanoic acid (VIII, infra) with an aldehyde in the presence of a base such as potassium hydroxide, sodium hydroxide, sodium methoxide and the like. Any solvent which is substantially inert to the reactants and in which the reagents are reasonably soluble may be used or alternatively an excess of the aldehyde reagent may also be used. The reaction may be conducted for a period of from about 0.5 to eight hours but, generally, two hours has proved sufficient. While the temperature at which the reaction is conducted is not critical, the reaction is most advantageously run at the reflux temperature of the solvent employed. The following equation illustrates this reaction:

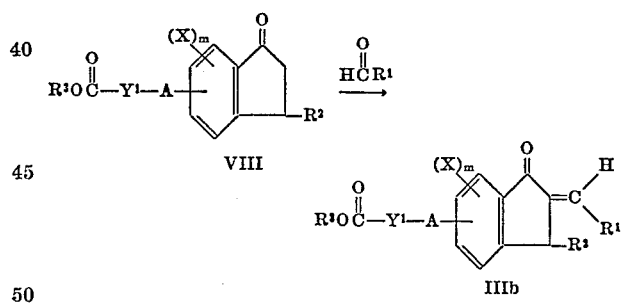

wherein A, $R^1$, $R^2$, $R^3$, m, X and $Y^1$ are as defined above.

The hydroxy (or thio)-2-alkylidene-1-indanone (IV, infra) employed as intermediates in the preparation of the ester derivatives of [1-oxo-2-alkylideneindanyloxy (or thio)]alkanoic acid and, also, in the etherification process for preparing the [1-oxo-2-alkylideneindanyloxy (or thio)]alkanoic acids (Ib, supra) are prepared by treating a suitable hydroxy (or thio)-2-halo-2-(substituted methyl)-1-indanone (IX, infra), with a dehydrohalogenating agent. The dehydrohalogenating agent is an inorganic salt, preferably an inorganic salt of lithium such as lithium bromide or lithium chloride. The reaction is generally carried out in dimethyl sulfoxide or in dimethylformamide at a temperature of from 50° to 150° C. for about 1 to 8 hours. Generally, we have found that most of the reactions are complete in two hours when heated on a steam bath. The following equation illustrates this process:

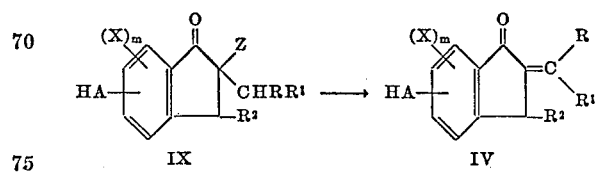

wherein A, R, R¹, R², m, X and Z are as defined above.

The [1-oxoindanyloxy (or thiol)]alkanoic acids (V, infra) employed as starting materials in the preparation of the [1-oxo-2-methyleneindanyloxy (or thio)]alkanoic acid products (Ic, supra) of this invention are themselves diuretically active and may be prepared by hydrolyzing the ester of an appropriate [1-oxoindanyloxy (or thio)]alkanoic acid (VIII, infra). The hydrolysis is conducted by treatment of the ester with a solution of an acid as, for example, by treatment with a mineral acid such as hydrochloric acid in acetic acid or, alternatively, the hydrolysis may be conducted by treatment with a solution of a base such as, for example, with an aqueous solution of sodium bicarbonate or an alcoholic solution of sodium hydroxide; however, when the hydrolysis is conducted in the presence of a base, it is necessary to treat the carboxylate salt intermediate thus formed with an acid to obtain the desired product. The following equation illustrates this method of preparation:

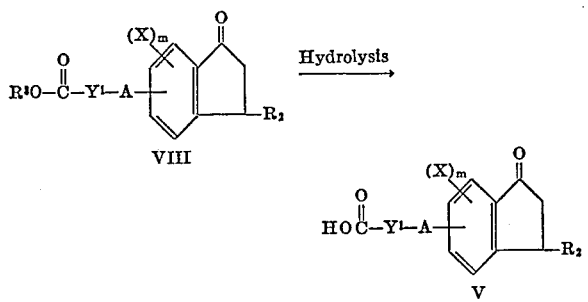

wherein A, R², R³, m, x and Y¹ are as defined above.

The [1-oxo-2-(substituted methyl)indanyloxy (or thio)]alkanoic acids (VII, infra) which are employed as starting materials in the preparation of [1-oxo-2-haloindanyloxy (or thio)]alkanoic acid intermediates (II, supra) are themselves diuretically active and are prepared by cyclialkylation of the appropriate [(2-alkylideneacyl)phenoxy (or phenylthio)]alkanoic acid (X, infra) using an electron-acceptor acid, for example, a Lewis acid such as concentrated sulfuric acid, polyphosphoric acid and the like. The reaction may be conducted at ambient temperatures but, generally, it is desirable to conduct the reaction at temperatures above ambient temperature. The following equation illustrates this process:

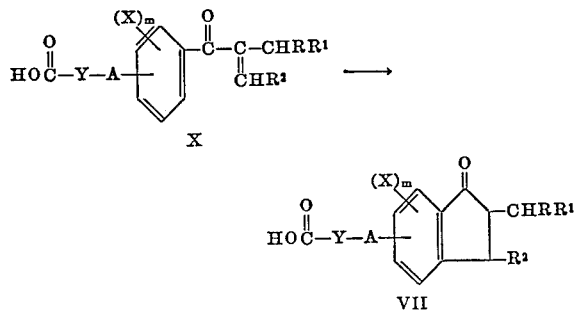

wherein A, R, R¹, R², m, X and Y are as defined above.

The oxime derivatives of the [1-oxo-2-substituted methylindanyloxy (or thio)]alkanoic acids (VIIa, infra) are also active as diuretic and saluretic agents and are prepared by reacting a [1-oxo-2-(substituted methyl)indanyloxy (or thio)]alkanoic acid (VII, infra) with hydroxylamine hydrochloride in the presence of a base such as pyridine in an alkanol such as absolute ethanol and the like. The reaction is conveniently conducted at the reflux temperature of the solvent medium over an extended period as, for example, over the two hour period usually required for completion of the reaction. The following equation illustrates this process:

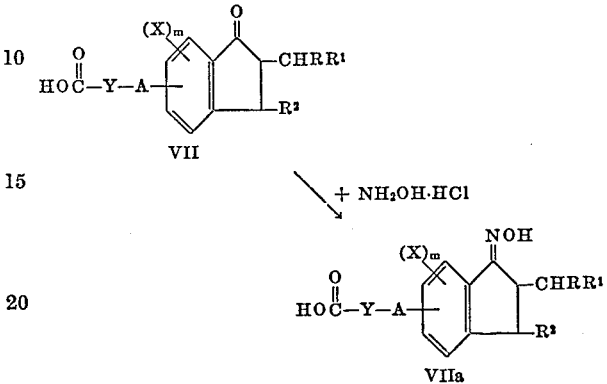

wherein A, R, R¹, R², m, X and Y are as defined above.

The ester derivatives of [1-oxoindanyloxy (or thio)] alkanoic acid (VIII, infra) which are used in the condensation process, supra, to prepare the [1-oxo-2-alkylideneindanyloxy (or thio)]alkanoic acid ester reactants (III, supra) and, also [1-oxoindanyloxy (or thio)]alkanoic acid starting materials (V, supra) are prepared by treating an appropriately substituted alkoxycarbonylalkoxy (or alkylthio) phenyl-β-substituted propionic acid (XI, infra) with thionyl chloride to produce the corresponding alkoxycarbonylalkoxy (or alkylthio) phenyl-β-substituted propionyl chloride which intermediate is then subjected to cyclization by treatment with a Friedel-Crafts catalyst such as aluminum chloride and the like in an appropriate inert solvent such as methylene chloride, carbon disulfide and the like. Although temperature is not critical, it is convenient to conduct the reaction at the reflux temperature of the particular solvent being used. The following equation illustrates this process:

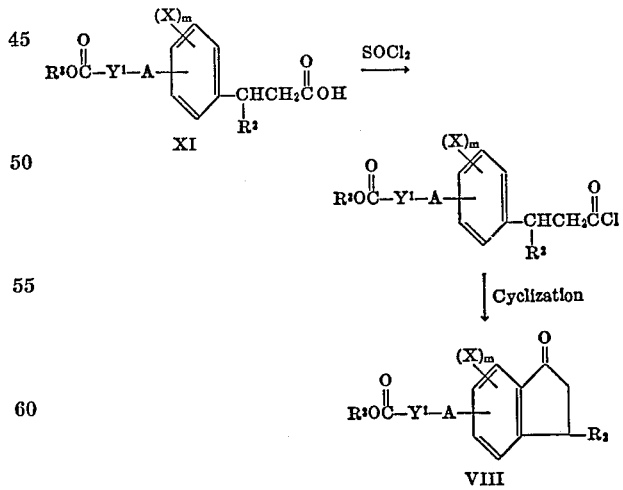

wherein A, R², R³, m, X and Y are as defined above.

The hydroxy (or thio)-2-halo-2-(substituted methyl)-1-indanones (IX, infra) which are used as intermediates in the preparation of the hydroxy (or thio)-2-alkylidene-1-indanone compounds (IV, supra) are prepared by the halogenation of the appropriate hydroxy (or thio)-2-substituted methyl-1-indanone (XII, infra) with a halogenating agent such as bromine, chlorine and the like. When bromine is used, a catalytic amount of 48% hydrobromic acid is usually added to initiate the reaction. Suitable reaction solvents may be employed but acetic acid has proved to be a particularly advantageous reaction medium. Also, the reaction may be conveniently conducted at ambient temperature. The following equation illustrates this process:

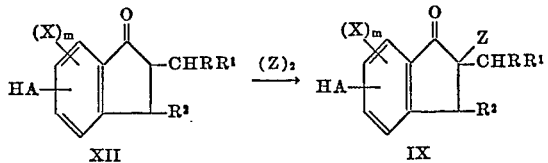

wherein A, R, R¹, R², m, X and Z are as defined above.

The [2 - (alkylideneacyl)phenoxy (or phenylthio)] alkanoic acid intermediates of the instant process (X, supra) are either known compounds or may be prepared by methods known to those skilled in the art. Thus, for example, the [(2 - methyleneacyl)phenoxy (or phenylthio)]alkanoic acid intermediates (Xa, infra) are prepared via the reaction of an appropriate alkanoylphenoxy (or phenylthio)alkanoic acid (XIII, infra) with a salt of a secondary amine such as a di-lower alkylamine, or cyclic amine such as piperidine, morpholine and the like in the presence of formaldehyde or paraformaldehyde to afford the corresponding Mannich amine salt (XIV, infra) which, upon treatment with a weak base such as sodium bicarbonate, either with or without heat or, alternatively, by heat alone, yields the desired [(2-methyleneacyl)phenoxy(or phenylthio)]alkanoic acid (Xa, infra). The following equation illustrates this method:

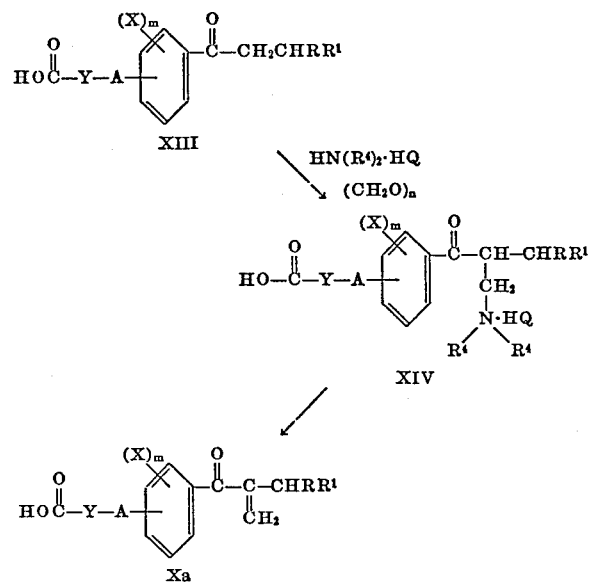

wherein A, R, R¹, R⁴, m, n, X, Y and HN(R⁴)₂·HQ are as defined above.

The substituted alkoxycarbonylalkoxy (or alkylthio) phenyl-β-substituted propionic acid (XI) used in the preparation of the ester derivatives of [1-oxoindanyloxy (or thio)]alkanoic acid (VIII) are prepared by the reduction of an appropriately substituted alkoxycarbonylalkoxy (or alkylthio)-β-substituted cinnamic acid (XV, infra). In practice the reduction is accomplished by treating an alkoxycarbonylalkoxy or alkylthio) phenyl-β-substituted cinnamic acid (XV, infra) with hydrogen in the presence of an appropriate catalyst such as palladium, platinum, ruthenium and the like which has been adsorbed on carbon. The reaction is generally conducted at about ambient temperature until the theoretical amount of hydrogen has been absorbed. Any solvent which is substantially inert to the reagents may be used as, for example, ethyl acetate, ethanol, and the like. The following equation illustrates this process:

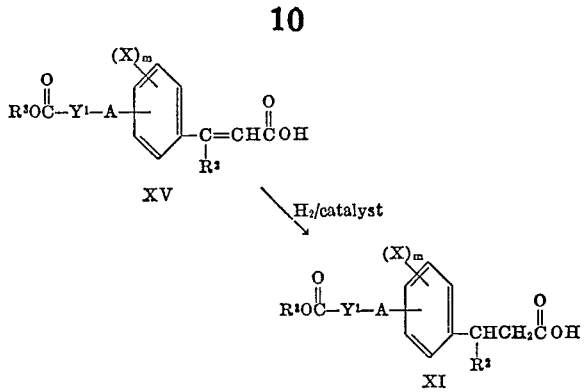

wherein A, R², R³, m, X and Y¹ are as defined above.

The hydroxy (or thio)-2-substituted methyl-1-indanones used in the preparation of the hydroxy (or thio)-2-halo-2-(substituted methyl)-1-indanone intermediates (IX) are prepared by the cyclialkylation of an appropriately substituted 2-(alkylideneacyl)phenol (or thiophenol) (XVI, infra) via treatment with an electron-acceptor acid, for example, a Lewis acid such as concentrated sulfuric acid, polyphosphoric acid and the like. The reaction may be conducted at ambient temperatures but, generally, it is desirable to conduct the reaction at temperatures above ambient temperatures. The following equation illlustrates this process:

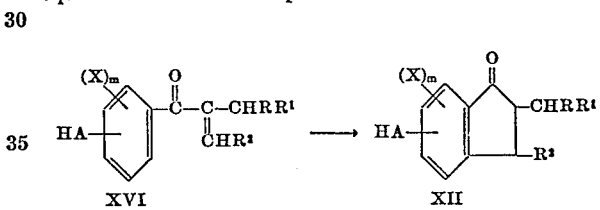

wherein A, R, R¹, R², m and X are as defined above.

The nuclear substituted alkanoylphenoxy (or phenylthio) alkanoic acids (XIII, infra) which are intermediates in the preparation of the Mannich amine intermediates, i.e., [2-(dialkylaminomethyl)acylphenoxy (or phenylthio)]alkanoic acid hydrohalide (XIV, supra) are either known or may be prepared by a variety of methods but, generally, the most advantageous route consists in the reaction of an alkanoyl halide with the appropriate phenoxy (or phenylthio) alkanoic acid (XVII, supra) in the presence of a Friedel-Crafts catalyst to produce the corresponding alkanoylphenoxy (or phenylthio) alkanoic acids. One Friedel-Crafts catalyst which has been found to be particularly suitable for this purpose is anhydrous aluminum chloride. The reaction solvent and the temperature at which the reaction is conducted are not particularly critical aspects of the reaction inasmuch as any solvent which is inert to the acid halide and phenoxy (or phenylthio) alkanoic acid reactants and Friedel-Crafts catalyst may be employed with good results and the reaction temperature may be varied to obtain the desired rate of reaction. In this regard, it has been found that carbon disulfide and petroleum ether are particularly suitable solvents in which to conduct the reaction and that the reaction proceeds most advantageously with slight heating as, for example, by heating at the reflux temperature of the solvent employed. The following equation illustrates this reaction:

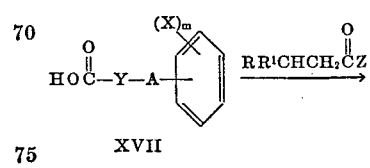

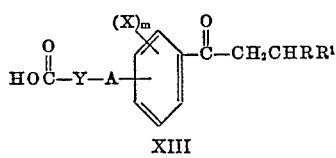

wherein A, R, R¹, m, X, Y and Z are as defined above.

The alkoxycarbonylalkoxy (or alkylthio) cinnamic acids (XVa, infra) employed as starting materials in the preparation of the substituted alkoxycarbonylalkoxy (or alkylthio) phenyl-β-substituted propionic acid intermediate (XI) are obtained by the condensation of the appropriate nuclear formyl substituted phenoxy (or phenylthio) alkanoic acid ester (XVIII, infra) with malonic acid. The reaction is carried out by simply mixing the reactants with a catalytic amount of an organic base such as pyridine in a suitable solvent such as a lower alkanol and allowing the mixture to stand for a period of from one to about 14 days at a temperature of from about ambient temperature up to the reflux temperature of the solvent being used. In general, the reaction is facilitated by the application of heat as, for example, by refluxing the reaction mixture for a period of about 18 hours in ethanol. The following equation illustrates this process:

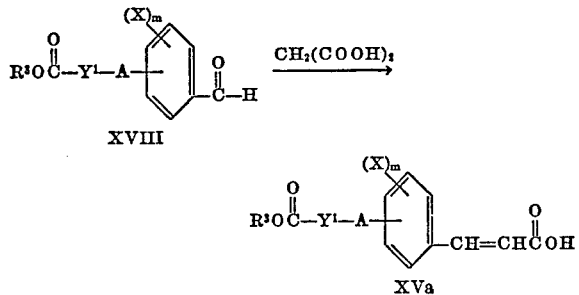

wherein A, R³, m, X and Y¹ are as defined above.

The 2-(alkylideneacyl)phenol (and thiophenol) intermediates (XVI, supra) are either known compounds or may be prepared by the Mannich reaction in the manner similar to that described for the preparation of [2-(methyleneacyl)phenoxy (or phenylthio)]alkanoic acid (Xa, supra), i.e., by the reaction of an alkanoylphenol (or thiophenol) (XIX, infra) with the salt of an appropriate secondary amine in the presence of formaldehyde or paraformaldehyde followed by treatment of the Mannich amine intermediate (XX, infra) thus obtained with a weak base such as sodium bicarbonate either with or without heat or, alternatively, with heat alone to afford the desired phenol or thiophenol (XVIa). The following equation illustrates this process:

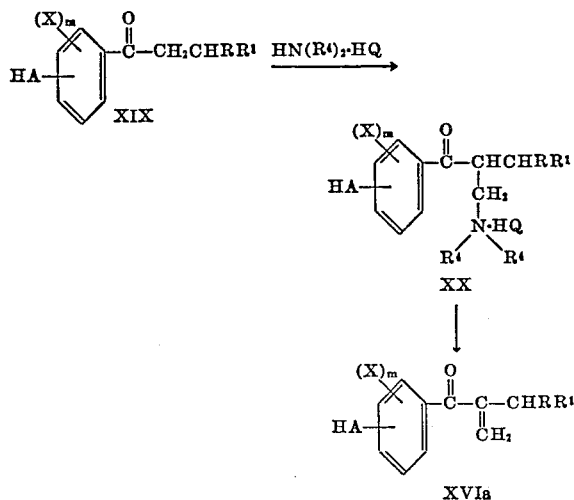

wherein A, R, R¹, m, X, R⁴ and HN(R⁴)₂·HQ are as defined above.

The nuclear formyl substituted phenoxy (or phenylthio) alkanoic acid ester derivatives (XVIII, infra) which are used in the preparation of the alkoxycarbonylalkoxy (or alkylthio) cinnamic acids (XVa, supra) are prepared by the etherification of a nuclear formyl substituted phenol (XXI, infra) with a halo alkanoic acid ester having the formula:

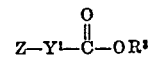

wherein R³, Y¹ and Z are as defined above. The following equation illustrates this reaction:

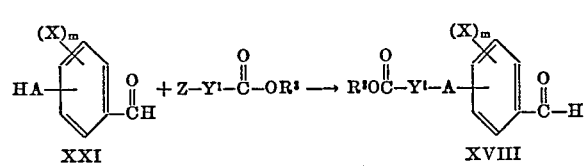

wherein A, R³, m, X, Y¹ and Z are as defined above.

In general, the reaction is conducted in the presence of a base such as potassium or sodium carbonate or potassium or sodium hydroxide or in the presence of a sodium alkoxide such as sodium ethoxide. The choice of a suitable reaction solvent is dependent largely upon the character of the reactants employed but, in general, any solvent which is substantially inert to the reactants and in which the reagents are reasonably soluble may be used such as ethanol, dimethylformamide and the like. The process may be conducted at ambient temperatures but, generally, it is desirable to conduct the process at temperatures above ambient temperatures.

The (1-oxo-2-alkylideneindanyloxy) alkanoic acids (I) of the invention are generally obtained as crystalline solids and, if desired, may be purified by recrystallization from a suitable solvent or a mixture of solvents. Suitable solvent systems include, for example, acetic acid, acetonitrile, ethyl acetate and the like.

Included within the scope of this invention are the non-toxic, pharmacologically acceptable acid addition salts of the instant products. In general, any base which will form an addition salt with the foregoing [1-oxo-2-alkylideneindanyloxy (or thio)] alkanoic acids and whose pharmacological properties will not cause an adverse physiological effect when ingested by the body system is considered as being within the scope of this invention; suitable bases thus include, for example, the alkali metal and alkaline earth metal hydroxides and carbonates, ammonia, primary, secondary and tertiary amines, such as mono-lower alkyl amines, di-lower alkyl amines, tri-lower alkyl amines, nitrogen-containing heterocyclic amines containing from 4 to 6 carbon atoms and the like.

Also included within the scope of this invention are the ester and amide derivatives of the instant products which are prepared by conventional methods well known to those skilled in the art. Thus, for example, the ester derivatives may be prepared by the reaction of a [1-oxo-2-alkylideneindanyloxy (or thio)]alkanoic acid of this invention with an alcohol as, for example, with a lower alkanol. The amide derivatives of the [1-oxo-2-alkylideneindanyloxy (and thio)]alkanoic acids of the invention may be prepared by converting a [1-oxo-2-alkylideneindanyloxy (or thio)] alkanoic acid to its corresponding acid chloride by treatment with thionyl chloride followed by treating said acid chloride with ammonia, an appropriate mono-lower alkyl amine, di-lower alkyl amine or a hetero amine, such as piperidine, morpholine and the like to produce the corresponding amide compound. These and other equivalent methods for the preparation of the ester and amide derivatives of the instant products will be apparent to one having ordinary skill in the art and to the extent that said derivatives are both non-toxic and physiologically acceptable to the body system, said derivatives are the functional equivalent of the corresponding [1-oxo-2-alkylideneindanyloxy (and thio)]alkanoic acids.

The examples which follow illustrate the [1-oxo-2-alkylideneindanyloxy (and thio)]alkanoic acid products (I) of the invention and the methods by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

Preparation of (1-oxo-2-ethylidene-6,7-dichloro-5-indanyloxy)acetic acid

Step A: Preparation of (1-oxo-2-ethyl-6,7-dichloro-5-indanyloxy)acetic acid.—[2,3 - dichloro-4-(2-methylenebutyryl)phenoxy]acetic acid (100 g.) is added with stirring to concentrated sulfuric acid (95–98%, 500 ml.) and heated at 60° C. for six hours. The reaction mixture is cooled and poured into a mixture of ice and water (4 l.). The crude product which separates is ground in a mortar, filtered, washed with water and dried. After recrystallization from acetic acid (450 ml.) there is obtained 56 g. (56%) of (1-oxo-2-ethyl-6,7-dichloro-5-indanyloxy)acetic acid which melts at 171–172° C.

Elemental analysis for $C_{13}H_{12}Cl_2O_4$.—Calc. (percent): C, 51.51; H, 3.99; Cl, 23.39. Found (percent): C, 52.01; H, 3.90; Cl, 23.14.

Step B: Preparation of (1-oxo-2-bromo-2-ethyl-6,7-dichloro-5-indanyloxy)acetic acid.—To a stirred suspension of (1-oxo-2-ethyl-6,7-dichloro - 5 - indanyloxy)acetic acid (30.3 g., 0.10 mole) in acetic acid (300 ml.) is added a solution of bromine (16.0 g., 0.10 mole) in acetic acid (50 ml.) over a period of 30 minutes. The reaction is catalyzed by the addition of 48% aqueous hydrobromic acid (2 drops). The clear yellow solution is stirred at room temperature for 30 minutes then poured into ice water (1 l.) containing sodium bisulfite (2 g.). The crude product (36 g., 97%) is filtered, washed with water and dried. It melts at 189–191° C. after recrystallization from a mixture of ethyl acetate and hexane.

Elemental analysis for $C_{13}H_{11}BrCl_2O_4$.—Calc. (percent): C, 40.87; H, 2.90; Br, 20.92; Cl, 18.56. Found (percent): C, 41.21; H, 3.17; Br, 20.71; Cl, 18.38.

Step C: Preparation of (1-oxo - 2 - ethylidene-6,7-dichloro-5-indanyloxy)acetic acid.—A solution of (1-oxo-2-bromo-2-ethyl-6,7-dichloro-5-indanyloxy)acetic acid (3.83 g., 0.01 mole) and lithium bromide (1.74 g., 0.02 mole) in dimethylformamide (20 ml.) is heated under an atmosphere of nitrogen on a steam bath for 1.5 hours. The reaction is poured into ice water (100 ml.) and the (1-oxo-2-ethylidene-6,7-dichloro - 5 - indanyloxy)acetic acid which separates is filtered and dried. After recrystallization from 2-propanol the product (1.9 g., 63%) melts at 235–237° C.

Elemental analysis for $C_{13}H_{10}Cl_2O_4$.—Calc. (percent): C, 51.85; H, 3.35; Cl, 23.55. Found (percent): C, 52.33; H, 3.34; Cl, 23.65.

EXAMPLE 2

(1-oxo-2-ethylidene-6-chloro-5-indanyloxy)acetic acid

Step A: (2-chloro-4-butyrylphenoxy)acetic acid.—A one liter three-necked flask fitted with a stirrer, condenser and drying tube is charged with (o-chlorophenoxy)acetic acid (37.2 g., 0.20 mole), carbon disulfide (400 ml.) and butyryl chloride (26.7 g., 0.25 mole). Aluminum chloride (86.9 g., 0.65 mole) is added to the reaction during one hour. The reaction mixture is stirred one hour at 25° C., two hours at 55° C. and then cooled. The carbon disulfide is decanted and the product is poured onto a mixture of ice (300 g.) and concentrated hydrochloric acid (50 ml.). The product is extracted into ether, washed with water, dried over magnesium sulfate and distilled at reduced pressure to leave 36 g. (71%) of (2-chloro-4-butyrylphenoxy)acetic acid which melts at 113–114° C. after recrystallization from butyl chloride.

Elemental analysis for $C_{12}H_{13}ClO_4$.—Calc. (percent): C, 56.15; H, 5.10; Cl, 13.81. Found (percent): C, 56.14; H, 5.13; Cl, 13.97.

Step B: [2 - chloro-4-(2-dimethylaminomethylbutyryl) phenoxy]acetic acid hydrochloride.—(2-chloro-4-butyrylphenoxy)acetic acid (12.8 g., 0.05 mole), paraformaldehyde (1.65 g., 0.055 mole) dimethylamine hydrochloride (4.62 g., 0.056 mole) and acetic acid (1 ml.) are combined and heated on a steam bath for three hours. The reaction mixture is treated with ethyl alcohol (75 ml.) and ether (125 ml.) which causes precipitation of 11.7 g. (69%) of [2 - chloro-4-(2-dimethylaminomethylbutyryl) phenoxy]acetic acid hydrochloride which melts at 182° C. after recrystallization from 2-propanol (90 ml.).

Elemental analysis for $C_{15}H_{21}Cl_2NO_4$.—Calc. (percent): C, 51.44; H, 6.04; N, 4.00. Found (percent): C, 51.52; H, 6.11; N, 3.97.

Step C: [2-chloro - 4 - (2-methylenebutyryl)phenoxy] acetic acid.—[2 - chloro - 4 - (2 - dimethylaminomethylbutyryl)phenoxy]acetic acid hydrochloride (8.7 g., 0.025 mole), water (100 ml.), and saturated aqueous sodium bicarbonate (100 ml.) are combined and heated on a steam bath for 2.5 hours. The reaction mixture is acidified, extracted with ether and dried over magnesium sulfate. Distillation of the solvent at reduced pressure leaves 1.3 g. (20%) of [2-chloro-4-(2-methylenebutyryl)phenoxy] acetic acid which melts at 83.5–85.5° C. after recrystallization from methyl cyclohexane (75 ml.).

Elemental analysis for $C_{13}H_{13}ClO_4$.—Calc. (percent): C, 58.11; H, 4.88; Cl, 13.20. Found (percent): C, 57.80; H, 5.20; Cl, 13.00.

Step D: Preparation of (1-oxo-2-ethyl-6-chloro-5-indanyloxy)acetic acid.—(1 - oxo - 2-ethyl-6-chloro-5-indanyloxy)acetic acid is prepared by following substantially the same procedure as described in Example 1, Step A, using the following reagents: [2-chloro-4-(2-methylenebutyryl) phenoxy]acetic acid (41.32 g., 0.154 mole) and conc. sulfuric acid (165 ml.). The crude yield of the product is 38.8 g. (94%), M.P. 132–138° C. Recrystallization from benzene gives (1-oxo-2-ethyl-6-chloro-5-indanyloxy) acetic acid as white prisms, M.P. 142–144° C.

Elemental analysis for $C_{13}H_{13}ClO_4$.—Calc. (percent): C, 58.11; H, 4.88; Cl, 13.20. Found (percent): C, 58.14; H, 4.76; Cl, 13.45.

Step E: (1 - oxo - 2-bromo-2-ethyl-6-chloro-5-indanyloxy)-acetic acid.—(1 - oxo - 2-bromo-2-ethyl-6-chloro-5-indanyloxy)acetic acid is prepared by following substantially the same procedure as described in Example 1, Step B, using the following reagents: (1-oxo-2-ethyl-6-chloro-5-indanyloxy)acetic acid (13.44 g., 0.05 mole), bromine (8.79 g., 0.055 mole), acetic acid (135 ml.) and 48% hydrobromic acid (2 drops). The crude yield of the product is 17.38 g. (100%), M.P. 157–159° C. Recrystallization from benzene gives (1-oxo-2-bromo-2-ethyl-6-chloro-5-indanyloxy)acetic acid as white needles, M.P. 159.5–160.5° C.

Elemental analysis for $C_{13}H_{12}BrClO_4$.—Calc. (percent): C, 44.92; H, 3.48; Cl, 10.20. Found (percent): C, 45.04; H, 3.45; Cl, 10.21.

Step F: (1 - oxo - 2-ethylidene-6-chloro-5-indanyloxy)-acetic acid.—A mixture of (1 - oxo - 2-bromo-2-ethyl-6-chloro-5-indanyloxy)acetic acid (6.95 g., 0.02 mole), lithium bromide (3.47 g., 0.04 mole) and dimethylformamide (50 ml.) is heated on a steam bath, with stirring, for 2.5 hours.

The reaction solution is cooled to room temperature and poured into ice water (250 ml.). The resulting solid product (5.12 g., 96%) is collected and dried. Recrystalization from acetic acid gives (1-oxo-2-ethylidene-6- chloro-5-indanyloxy)acetic acid as orange needles, M.P. 222–223° C.

Elemental analysis for $C_{13}H_{11}ClO_4$.—Calc. (percent): C, 58.55; H, 4.16; Cl, 13.30. Found (percent): C, 58.84; H, 4.24; Cl, 13.41.

EXAMPLE 3

(1-oxo-2-ethylidene-4,6-dichloro-5-indanyloxy)acetic acid

Step A: (1 - oxo - 2 - ethyl-4,6-dichloro-5-indanyloxy)acetic acid.—Finely ground [2,6-dichloro-4-(2-methylenebutyryl)phenoxy]acetic acid (2.0 g., 0.006 mole) is added portionwise to concentrated sulfuric acid (8 ml.) at room temperature. The resulting solution is allowed to stand at 50–55° C. for 2 hours. The reaction solution is cooled to room temperature and added, dropwise, to ice water (40 ml.). The resulting solid (1.95 g., 98%) is collected and dried. Recrystallization from butyl chloride gives (1-oxo-2 - ethyl - 4,6-dichloro-5-indanyloxy)acetic acid as white needles, M.P. 151–153° C.

Element analysis for $C_{13}H_{12}Cl_2O_4$.—Calc. (percent): C, 51.51; H, 3.99; Cl, 23.29. Found (percent): C, 51.62; H, 4.29; Cl, 23.21.

Step B: (1-oxo-2-bromo-2-ethyl-4,6-dichloro-5-indanyloxy)acetic acid.—A suspension of (1-oxo-2-ethyl-4,6-dichloro-5-indanyloxy)acetic acid (15.16 g., 0.05 mole) in acetic acid (120 ml.) is treated over a period of 20 minutes with a solution of bromine (8.79 g., 0.055 mole) in acetic acid (15 ml.). The bromination is initiated by the addition of two drops of 48% aqueous hydrobromic acid solution. The resulting solution is stirred for 30 minutes at room temperature, then poured into ice water (675 ml.) containing sodium bisulfite (3 g.). The resulting solid (18.8 g., 98%) is collected and dried. Recrystallization from butyl chloride gives (1-oxo-2-bromo-2-ethyl-4,6-dichloro-5-indanyloxy)acetic acid as white prisms, M.P. 154–156° C.

Elemental analysis for $C_{13}H_{11}BrCl_2O_4$.—Calc. (percent): C, 40.87; H, 2.90; Cl, 18.56. Found (percent): C, 41.16; H, 3.00; Cl, 18.32.

Step C: 2 - ethylidene - 4,6 - dichloro-5-hydroxy-1-indanone.—A mixture of (1-oxo-2-bromo-2-ethyl-4,6-dichloro-5-indanyloxy)acetic acid (10.39 g., 0.0272 mole), lithium bromide (4.98 g., 0.0574 mole) and dimethylformamide (65 ml.) is heated on a steam bath for 16 hours, cooled to room temperature and poured into ice water (325 ml.). The resulting solid (6.43 g., 79%) is collected and dried. Recrystallization from nitromethane gives 2-ethylidene-4,6-dichloro-5-hydroxy-1-indanone as a yellow solid, M.P. 207–208° C.

Elemental analysis for $C_{11}H_8Cl_2O_2$.—Calc. (percent): C, 54.35; H, 3.32; Cl, 29.17. Found (percent): C, 54.39; H, 3.25; Cl, 29.35.

Step D: (1-oxo-2-ethylidene-4,6-dichloro-5-indanyloxy)acetic acid.—To a solution of 2-ethylidene-4,6-dichloro-5-hydroxy-1-indanone (5.66 g., 0.0233 mole) in dimethylformamide (22 ml.) is added potassium carbonate (7.09 g., 0.0513 mole). Ethyl bromoacetate (8.57 g., 0.0513 mole) is then added and the mixture is heated in a water bath at 55–60° C. for 1.5 hours, with stirring. The mixture is cooled to room temperature and treated with water (66 ml.) to precipitate ethyl (1-oxo-2-ethylidene-4,6-dichloro-5-indanyloxy)acetate which is collected and washed with water. A mixture of the ester, acetic acid (40 ml.) and 5% hydrochloric acid solution (20 ml.) is heated on a steam bath with stirring for 30 minutes. The reaction solution is cooled to room temperature, treated with water (60 ml.) and the resulting solid (6.11 g., 87%) is collected, dried and recrystallized from acetic acid to give (1-oxo-2-ethylidene - 4,6 - dichloro-5-indanyloxy)acetic acid as tan needles, M.P. 204–206° C.

Elemental analysis for $C_{13}H_{10}Cl_2O_4$.—Calc. (percent): C, 51.85; H, 3.35; Cl. 23.55. Found (percent): C, 51.75; H, 3.42; Cl. 23.68.

EXAMPLE 4

(1-oxo-2-ethylidene-4,6,7-trimethyl-5-indanyloxy) acetic acid

Step A: (1 - oxo-2-ethyl-4,6,7-trimethyl-5-indanyloxy) acetic acid.—Finely ground [2,3,6-trimethyl-4-(2-methylenebutyryl)phenoxy]acetic acid (12.18 g., 0.044 mole) is added portionwise, over a period of one hour, to concentrated sulfuric acid (49 ml.) at room temperature. The resulting reddish-brown solution is allowed to stand in the refrigerator at 0° C. for six days.

The reaction solution is added dropwise to ice water (245 ml.) and the crude product (11.6 g., 96%) is collected, dried and recrystallized from butyl chloride to yield substantially pure (1-oxo-2-ethyl-4,6,7-trimethyl-5-indanyloxy)acetic acid, M.P. 136–137° C.

Elemental analysis for $C_{16}H_{20}O_4$.—Calc. (percent): C, 69.54; H, 7.30. Found (percent): C, 69.74; H, 7.14.

Step B: (1 - oxo - 2-bromo-2-ethyl-4,6,7-trimethyl-5-indanyloxy)acetic acid.—(1 - oxo-2-bromo-2-ethyl-4,6,7-trimethyl-5-indanyloxy)acetic acid is prepared by following substantially the same procedure as described in Example 1, Step B, using the following reagents: (1-oxo-2-ethyl-4,6,7-trimethyl-5-indanyloxy)acetic acid (11.79 g., 0.0427 mole( bromine (7.51 g., 0.0470 mole) acetic acid (118 ml.) and 48% hydrobromic acid (2 drops). The crude yield is 14.76 g. (97%). Recrystallization from butyl chloride gives (1 - oxo-2-bromo-2-ethyl-4,6,7-trimethyl-5-indanyloxy)acetic acid as white prisms, M.P. 144–145° C.

Elemental analysis for $C_{16}H_{19}BrO_4$—Calc. (percent): C, 54.10; H, 5.39; Br, 22.50. Found (percent): C, 54.09; H, 5.15; Br, 22.30.

Step C: (1-oxo - 2 - ethylidene - 4,6,7 - trimethyl-5-indanyloxy)acetic acid.—(1-oxo - 2 - ethylidene - 4,6,7-trimethyl - 5 - indanyloxy)acetic acid is prepared by following substantially the same procedure as described in Example 1, Step C, using the following reagents: (1-oxo - 2 - bromo - 2 - ethyl - 4,6,7 - trimethyl-5-indanyloxy)acetic acid (10.41 g., 0.0293 mole), lithium bromide (5.09 g., 0.0586 mole) and dimethylformamide (73 ml.). The crude yield in 8.02 g. (100%). Recrystallization from acetic acid gives (1-oxo-2-ethylidene-4,6,7-trimethyl-5-indanyloxy)acetic acid as orange-yellow needles, M.P. 209.5–210.5° C.

Elemental analysis for $C_{16}H_{18}O_4$.—Calc. (percent): C, 70.06; H, 6.61. Found (percent): C, 69.73; H, 6.48.

EXAMPLE 5

Preparation of (1-oxo-2-ethylidene-5-indanyloxy) acetic acid

Step A: Preparation of (1-oxo-2-ethyl-5-indanyloxy) acetic acid.—A solution of [4 - (2 - methylenebutyryl) phenoxy]acetic acid (14.8 g., 0.063 mole) and conc. sulfuric acid (30 ml.) is heated to 80° C. The reaction mixture is cooled and poured into ice water (300 ml.). The solid product that separates is collected and washed with water. The yield is 13.2 g. (89%). Recrystallization from ethyl acetate gives (1 - oxo-2-ethyl-5-indanyloxy) acetic acid as a white solid, M.P. 130.5–132.5° C.

Elemental analysis for $C_{13}H_{14}O_4$.—Calc. (percent): C, 66.65; H, 6.02. Found (percent): C, 66.58; H, 6.07.

Step B. Preparation of (1-oxo - 2 - bromo-2-ethyl-5-indanyloxy)acetic acid.—Bromine (4 g., 0.025 mole) is added dropwise during 5 minutes to a solution of (1-oxo - 2 - ethyl - 5 - indanyloxy)acetic acid (5.8 g., 0.025 mole) in acetic acid (80 ml.). After 5 minutes, the reaction mixture is poured into water (800 ml.) containing sodium bisulfite (5 g.) to precipitate the product as a crystalline white solid. It is collected and washed with water. The yield of (1-oxo - 2 - bromo - 2 - ethyl - 5-indanyloxy)acetic acid is 6.5 g. (83%), M.P. 146–149° C.

Elemental analysis for $C_{13}H_{13}BrO_4$.—Calc. (percent): C, 49.86; H, 4.18. Found (percent): C, 49.68; H, 4.07.

Step C: Preparation of (1-oxo - 2 - ethylidene-5-indanyloxy)acetic acid.—A solution of (1-oxo - 2 - bromo-2-ethyl - 5 - indanyloxy)acetic acid (4.1 g., 0.013 mole), lithium bromide (2.28 g., 0.026 mole), and dimethylformamide (25 ml.) is heated at 80° C. for 2 hours. The reaction mixture is cooled and poured into water (100 ml.) whereupon the product separates as a yellow solid which is collected and washed with water. After recrystallization from ethyl acetate, the yield is 2.2 g. (72.6%) of (1 - oxo - 2 - ethylidene - 5 - indanyloxy) acetic acid, M.P. 177.5–183.5° C.

Elemental analysis for $C_{13}H_{14}O_4$.—Calc. (percent): C, 66.65; H, 6.02. Found (percent): C, 66.58; H, 6.07.

EXAMPLE 6

Preparation of (1-oxo-2-ethylidene-4-chloro-7-indanyloxy)acetic acid

Step A: Preparation of (1-oxo-2-ethyl - 4 - chloro-7-indanyloxy)acetic acid.—[2 - (2 - methylenebutyryl)-4-chlorophenoxy]acetic acid (35.5 g., 0.132 mole) and conc. sulfuric acid (125 ml.) are mixed and allowed to stand at room temperature. After 5 days, the reaction mixture is poured into cold water (1500 ml.). The solid that separates is collected, washed well with water, dried and recrystallized from acetic acid to yield 23 g. (65%) of (1-oxo - 2 - ethyl - 4 - chloro - 7 - indanyloxy)acetic acid, M.P. 154–163° C. This is the material used for subsequent bromination. A small sample of (1-oxo-2-ethyl-4-chloro-7-indanyloxy)acetic acid is further recrystallized from acetic acid, M.P. 161–167° C.

Elemental analysis for $C_{13}H_{13}ClO_4$.—Calc. (percent): C, 58.11; H, 4.87. Found (percent): C, 58.39; H, 4.77.

Step B: Preparation of (1-oxo-2-bromo - 2 - ethyl-4-chloro - 7 - indanyloxy)acetic acid.—Bromine (13 g., 0.081 mole) is added dropwise for 20 minutes to a solution of (1-oxo - 2 - ethyl - 4 - chloro - 7 - indanyloxy) acetic acid (21.7 g., 0.081 mole) in acetic acid (350 ml.). After 15 minutes, the reaction mixture is poured into a solution of sodium bisulfite (20 g.) in water (3000 ml.). The solid product separates, is collected, washed with water, and then dried to yield 23.5 g. of (1-oxo-2-bromo-2-ethyl - 4 - chloro - 7 - indanyloxy)acetic acid, M.P. 135.5–146.5° C. This crude product is used in Step C. A small sample is recrystallized repeatedly from a mixture of acetic acid and water to yield a substantially pure product, M.P. 148–150° C.

Elemental analysis for $C_{13}H_{12}BrClO_4$.—Calc. (percent): C, 44.92; H, 3.48. Found (percent): C, 45.13; H, 3.56.

Step C: Preparation of (1 - oxo - 2 - ethylidene - 4-chloro-7-indanyloxy)acetic acid.—A solution of (1-oxo-2-bromo - 2 - ethyl - 4 - chloro - 7 - indanyloxy)acetic acid (21.5 g., 0.07 mole), lithium bromide (12.2 g., 0.14 mole), and dimethylformamide (125 ml.) is heated at 80° C. for two hours. The reaction mixture is cooled and poured into water (1000 ml.) to precipitate the crude product as a yellow solid. Recrystallization from ethyl acetate yields 10.4 g. (56%) of (1-oxo - 2 - ethylidene-4-chloro - 7 - indanyloxy)acetic acid, M.P. 184.5–192.5° C.

Elemental analysis for $C_{13}H_{11}ClO_4$.—Calc. (percent): C, 58.55; H, 4.16; Cl, 13.30. Found (percent): C, 58.54; H, 3.92; Cl, 13.33.

EXAMPLE 7

Preparation of (1-oxo-2-ethylidene-6,7-dimethyl-5-indanyloxy)acetic acid

Step A: Preparation of (1-oxo-2-ethyl-6,7-dimethyl-5-indanyloxy)acetic acid.—By following substantially the procedure described in Example 1, Step A, and using as the reactants [2,3-dimethyl - 4 - (2 - methylenbutyryl) phenoxy]acetic acid (40 g.) and concentrated sulfuric acid (160 ml.), there is obtained 40 g. (100%) of (1-oxo - 2 - ethyl - 6,7 - dimethyl - 5 - indanyloxy)acetic acid which melts at 206° C. after recrystallization from acetonitrile (1.6 l.).

Elemental analysis for $C_{15}H_{18}O_4$.—Calc. (percent): C, 68.68; H, 6.92. Found (percent): C, 68.37; H, 6.95.

Step B: Preparation of (1-oxo - 2 - bromo - 2 - ethyl-6,7 - dimethyl - 5 - indanyloxy)acetic acid.—By following substantially the same procedure as described in Example 1, Step B, using as the reactants (1-oxo - 2 - ethyl - 6,7-dimethyl - 5 - indanyloxy)acetic acid (10.5 g., 0.04 mole), bromine (6.4 g., 0.04 mole), acetic acid (125 ml.) and 48% aqueous hydrobromic acid (2 drops), there is obtained 8.6 g. (63%) of (1-oxo-2-bromo-2-ethyl-6,7-dimethyl - 5 - indanyloxy)acetic acid which melts at 136–139° C. after recrystallization from butyl chloride (200 ml.).

Elemental analysis for $C_{15}H_{17}BrO_4$.—Calc. (percent): C, 52.80; H, 5.02; Br. 23.42. Found (percent): C, 52.94; H, 5.26; Br, 23.75.

Step C: Preparation of (1-oxo-2-ethylidene-6,7-dimethyl-5-indanyloxy)acetic acid.—By following substantially the procedure described in Example 1, Step C, using as the reactants (1-oxo-2-bromo-2-ethyl-6,7-dimethyl-5-indanyloxy)acetic acid (5.24 g., 0.02 mole), lithium bromide (3.4 g., 0.04 mole) and dimethylformamide (40 ml.) there is obtained 3.4 g. (90%) of (1-oxo-2-ethylidene-6,7-dimethyl-5-indanyloxy)acetic acid which melts at 236–239° C. after recrystallization from acetic acid (50 ml.).

Elemental analysis for $C_{15}H_{16}O_4$.—Calcd. (percent): C, 69.22; H, 6.20. Found (percent): C, 69.65; H, 6.03.

EXAMPLE 8

Preparation of (1-oxo-2-methylene-3,7-dimethyl-5-indanyloxy)acetic acid

Step A: Preparation of (1-oxo-3,7-dimethyl-5-indanyloxy)acetic acid.—By following substantially the procedure described in Example 1, Step A, using as the reactants (3-methyl-4-crotonoylphenoxy)acetic acid (6.5 g.) and concentrated sulfuric acid (30 ml.) there is obtained 3.8 g. (59%) of (1-oxo-3,7-dimethyl-5-indanyloxy)acetic acid which melts at 183–185° C. after recrystallization from nitromethane.

Elemental analysis for $C_{13}H_{14}O_4$.—Calc. (percent): C, 66.65; H, 6.02. Found (percent): C, 66.31; H, 6.01.

Step B: Preparation of (1-oxo-2-methylene-3,7-dimethyl-5-indanyloxy)acetic acid.—A mixture of (1-oxo-3,7-dimethyl-5-indanyloxy)acetic acid (4.2 g., 0.018 mole), paraformaldehyde (0.75 g., 0.025 mole) dimethylamine hydrochloride (2.0 g., 0.025 mole) and acetic acid (3.0 ml.) is heated on a steam bath for two hours. Treatment of the cooled reaction mixture with ethyl alcohol (50 ml.) and ether (150 ml.) gives a solid which is filtered, dissolved in dimethylformamide (25 ml.) and heated on a steam bath for two hours. The reaction mixture is poured into cold 1 N hydrochloric acid (200 ml.) and there is obtained by filtration 2.0 g. (45%) of (1-oxo-2-methylene-3,7-dimethyl-5-indanyloxy)acetic acid which melts at 194–196° C. after recrystallization from acetonitrile (50 ml.).

Elemental analysis for $C_{14}H_{14}O_4$.—Calc. (percent): C, 68.26; H, 5.73. Found (percent): C, 68.09; H, 5.64.

EXAMPLE 9

Preparation of (1-oxo-2-methylene-3,6,7-trimethyl-5-indanyloxy)acetic acid

Step A: (2,3-dimethyl - 4 - crotonoylphenoxy)acetic acid.—By following substantially the procedure described in Example 2, Step A, using as the reactants (2,3-dimethylphenoxy)acetic acid (77 g., 0.427 mole) crotonoyl chloride (47 g., 0.448 mole), carbon disulfide (600 ml.) and aluminum chloride (170 g., 1.28 mole) there is obtained 25 g. of the crude product as an oil which is used in Step B without further purification.

Step B: (1-oxo-3,6,7 - trimethyl - 5 - indanyloxy-acetic acid.—By following substantially the same procedure described in Example 1, Step A, using as the reactants (2,3-dimethyl-4-crotonoylphenoxy)acetic acid (25 g.) and conc. sulfuric acid (100 ml.) there is obtained 20 g. (80%) of (1-oxo-3,6,7-trimethyl-5-indanyloxy)acetic acid which after recrystallization from ethanol melts at 224° C.

Elemental analysis for $C_{14}H_{16}O_4$.—Calc. (percent): C, 67.73; H, 6.50. Found (percent): C, 67.44; H, 6.34.

Step C: (1-oxo-2-dimethylaminomethyl-3,6,7-trimethyl-5-indanyloxy)acetic acid hydrochloride.—A mixture of the (1-oxo-3,6,7-trimethyl-5-indanyloxy)acetic acid (4.45 g., 0.018 mole), paraformaldehyde (0.75 g., 0.025 mole), dimethylamine hydrochloride (2.0 g., 0.0244 mole), and acetic acid (3 ml.) is heated on a steam bath for two hours, cooled and triturated with ethanol (30 ml.) to yield (1 - oxo-2-dimethylaminomethyl-3,6,7-trimethyl-5-indanyloxy)acetic acid hydrochloride (4.8 g., 78%) which melts at 205–207° C. after recrystallization from methanol.

Elemental analysis for $C_{17}H_{24}ClNO_4$.—Calc. (percent): C, 59,73; H, 7.08; N, 4.10. Found (percent): C, 59.35; H, 6.82; N, 4.01.

Step D: (1-oxo-2-methylene-3,6,7-trimethyl - 5 - indanyloxy)acetic acid.—(1-oxo-2-dimethylaminomethyl-3,6,7-trimethyl-5-indanyloxy)acetic acid hydrochloride (3.3 g.) is dissolved in dimethylformamide (30 ml.) and heated on a steam bath for 2 hours. The reaction mixture is poured into water (500 ml.) and treated with concentrated hydrochloric acid (20 ml.). The (1-oxo-2-methylene-3,6,7-trimethyl-5-indanyloxy)acetic acid which separates (2.0 g., 80%) melts at 186–188° C. after recrystallization from acetonitrile.

Elemental analysis for $C_{15}H_{16}O_4$.—Calc. (percent): C, 69.22; H, 6.20. Found (percent): C, 68.88; H, 5.83.

EXAMPLE 10

Preparation of (1-oxo-2-ethylidene-6,7-dichloro-5-indanyloxy)acetic acid

Step A: Preparation of 2-ethyl-5-hydroxy-6,7 dichloro-1-indanone.—By following substantially the procedure described in Example 1, Step A, using as the reactants 2,3-dichloro-4-(2-methylenebutyryl)phenol (18 g.) and concentrated sulfuric acid (76 ml.) there is obtained 11.8 g. (66%) of 2-ethyl-5-hydroxy-6,7-dichloro-1-indanone which melts at 237–239° C. after recrystallization from methyl alcohol (300 ml.).

Elemental analysis for $C_{11}H_{10}Cl_2O_2$.—Calc. (percent): C, 53.90; H, 4.11; Cl, 28.93. Found (percent): C, 53.82; H, 4.08; Cl, 28.87.

Step B: 2-bromo-2-ethyl - 5 - hydroxy-6,7-dichloro-1-indanone.—2-bromo - 2 - ethyl-5-hydroxy-6,7-dichloro-1-indanone is prepared by following substantially the same procedure described in Example 1, Step B, using as the reactants: 2-ethyl-5-hydroxy - 6,7 - dichloro-1-indanone (3.92 g., 0.016 mole), bromine (2.56 g., 0.16 mole), acetic acid (50 ml.) and 48% hydrobromic acid (2 drops). The procedure yields 2.7 g. (52%) of 2-bromo-2-ethyl-5-hydroxy-6,7-dichloro-1-indanone which after recrystallization from methanol melts at 208–211° C.

Elemental analysis for $C_{11}H_9BrCl_2O_2$.—Calc. (percent): C, 40.77; H, 2.80; Br, 24.66; Cl, 21.88. Found (percent): C, 41.03; H, 2.93; Br, 24.44; Cl, 21.63.

Step C: 2-ethylidene-5-hydroxy - 6,7 - dichloro-1-indanone.—2-ethylidene - 5 - hydroxy-6,7-dichloro-1-indanone is prepared following substantially the same procedure described in Example 1, Step C, using as the reactants 2-bromo-2-ethyl-5-hydroxy-6,7-dichloro-1-indanone (7.0 g.), lithium bromide (4.2 g.) and dimethylformamide (30 ml.). The above procedure gives 4.5 g. (85%) of 2-ethylidene-5-hydroxy-6,7-dichloro-1-indanone which after recrystallization from butyl acetate melts at 297.5° C.

Elemental analysis for $C_{11}H_8Cl_2O_2$.—Calc. (percent): C, 54.35; H, 3.32; Cl, 29.17. Found (percent): C, 54.59; H, 3.34; Cl, 29.31.

Step D: Ethyl (1 - oxo-2-ethylidene-6,7-dichloro-5-indanyloxy) acetate.—A mixture of 2-ethylidene-5-hydroxy-6,7-dichloro-1-indanone (4.86 g., 0.02 mole), dimethylformamide (20 ml.), potassium carbonate (6.08 g., 0.044 mole) and ethyl bromoacetate (7.55 g., 0.044 mole) is stirred and heated on a water bath at 60° C. for one hour. The reaction mixture is poured into ice water (60 ml.) and extracted with ether. The ether extract is washed with water, dried over anhydrous magnesium sulfate and the ether removed at reduced pressure to yield ethyl (1-oxo-2-ethylidene-6,7-dichloro-5-indanyloxy)acetate.

Step E: (1 - oxo-2-ethylidene-6,7-dichloro-5-indanyloxy)acetic acid.—A mixture of ethyl (1-oxo-2-ethylidene - 6,7 - dichloro - 5 - indanyloxy)acetate (3.29 g., 0.01 mole), saturated aqueous sodium bicarbonate (50 ml.) and ethanol (50 ml.) is heated at reflux for one hour. The solution is filtered, acidified with concentrated hydrochloric acid, and the (1-oxo-2-ethylidene-6,7-dichloro-5-indanyloxy)acetic acid which separates is purified by recrystallization from acetic acid, M.P. 171–172° C.

EXAMPLE 11

(1-oxo-2-ethylidene-6,7-dichloro-5-indanyloxy) acetic acid

2 - ethylidene - 5 - hydroxy-6,7-dichloro-1-indanone (5.40 g., 0.0224 mole) prepared as described in Example 10, Step C, is stirred and heated under reflux for 20 hours with a mixture of iodoacetic acid (4.5 g., 0.024 mole), potassium carbonate (3.33 g., 0.024 mole) and acetone (200 ml.). The acetone is removed at reduced pressure and residual salt is dissolved in water and then acidified with dilute hydrochloric acid to precipitate the (1-oxo - 2 - ethylidene-6,7-dichloro-5-indanyloxy)acetic acid, M.P. 171–172° C.

EXAMPLE 12

[1-oxo-2-ethylidene-5-(2,3-dihydro-(1H-benz[e]indenyloxy)]acetic acid

Step A: [1 - oxo-2-ethyl-5-(2,3-dihydro-1H-benz[e]indenyloxy)]acetic acid.—By following substantially the procedure described in Example 1, Step A, and using as the reactants [4-(2-methylenebutyryl)naphthyloxy] acetic acid (25 g.) and concentrated sulfuric acid (100 ml.) there is obtained 15.5 g. (62%) of [1-oxo-2-ethyl-5-(2,3-dihydro-1H-benz[e]indenyloxy)]acetic acid which after recrystallization from 2-ethoxyethanol (200 ml.) melts at 245–257 C.

Elemental analysis for $C_{17}H_{16}O_4$.—Calc. (percent): C, 71.82; H, 5.67. Found (percent): C, 71.55; H, 5.88.

Step B: [1 - oxo - 2 - bromo-2-ethyl-5-(2,3-dihydro-1H-benz[e]indenyloxy)]acetic acid.—To a stirred suspension of [1-oxo-2-ethyl-5-(2,3-dihydro-1H-benz[e]indenyloxy)]acetic acid in acetic acid is added a solution of bromine in acetic acid over a period of 30 minutes. The reaction is catalyzed by the addition of 48% hydrobromic acid (2 drops). The reaction mixture is poured into ice water containing sodium bisulfite (2.0 g.) whereupon [1-oxo-2-bromo-2-ethyl - 5 - (2,3-dihydro-1H-benz[e]indenyloxy)]acetic acid precipitates.

Step C: [1 - oxo - 2 - ethylidene-5-(2,3-dihydro-1H-benz[e]indenyloxy]acetic acid.—A solution of [1-oxo-2-bromo-2-ethyl-5-(2,3-dihydro-1H - benz[e]indenyloxy)] acetic acid (3.63 g. 0.01 mole) and lithium bromide (1.74 g., 0.02 mole) in dimethylformamide (20 ml.) is heated under a nitrogen atmosphere on a steam bath for 1.5 hours. The reaction mixture is poured into ice water (100 ml.) to precipitate the [1-oxo-2-ethylidene-5-(2,3-dihydro-1H-benz[e]indenyloxy)]acetic acid.

EXAMPLE 13

(1-oxo-2-cyclohexylidene-6,7-dichloro-5-indanyloxy) acetic acid

Step A: (1 - oxo - 2 - cyclohexyl - 6,7 - dichloro - 5-indanyloxy)acetic acid.—By following substantially the procedure described in Example 1, Step A, and by substituting for the [2,3-dichloro-4-(2-methylenebutyryl) phenoxy]acetic acid described therein [2,3-dichloro-4-(2- cyclohexylacryloyl)phenoxy]acetic acid (2.2 g.), there is obtained 2.2 grams of (1-oxo-2-cyclohexyl-6,7-dichloro-5-indanyloxy)acetic acid which after recrystallization from nitromethane (15 ml.) melts at 182–184° C.

Elemental analysis for $C_{17}H_{18}Cl_2O_4$.—Calc. (percent): C, 57.16; H, 5.08; Cl, 19.85. Found (percent): C, 57.26; H, 4.82; Cl, 19.58.

Step B: (1-oxo - 2 - bromo-2-cyclohexyl-6,7-dichloro-5-indanyloxy)acetic acid.—By following substantially the same procedure as described in Example 1, Step B, the (1-oxo-2-cyclohexyl - 6,7 - dichloro-5-indanyloxy)acetic acid is brominated to yield (1-oxo-2-bromo-2-cyclohexyl-6,7-dichloro-5-indanyloxy)acetic acid.

Step C: (1-oxo - 2 - cyclohexylidene-6,7-dichloro-5-indanyloxy)acetic acid.—A solution of (1-oxo-2-bromo-2-cyclohexyl-6,7-dichloro-5-indanyloxy)acetic acid (4.36 g., 0.01 mole) and lithium bromide (1.74 g., 0.02 mole) in dimethylformamide (20 ml.) is heated under a nitrogen atmosphere for 1.5 hours. On pouring the reaction into ice water (100 ml.), the (1-oxo-2-cyclohexylidene-6,7-dichloro-5-indanyloxy)acetic acid separates and is filtered and dried.

EXAMPLE 14

(1-oxo-2-ethylidene-7-bromo-5-indanyloxy)acetic acid

Step A: (1 - oxo - 2 - ethyl - 7 - bromo-5-indanyloxy) acetic acid.—By following substantially the procedure described in Example 1, Step A, and using as the reactants [3-bromo-4-(2-methylenebutyryl)phenoxy]acetic acid and concentrated sulfuric acid, there is obtained crude product which after recrystallization from acetic acid yields substantially pure (1-oxo-2-ethyl-7-bromo-5-indanyloxy)acetic acid, M.P. 146–148° C.

Elemental analysis for $C_{13}H_{13}BrO_4$.—Calc. (percent): C, 49.86; H, 4.18; Br, 25.52. Found (percent): C, 49.87; H, 4.29; Br, 25.38.

Step B: (1-oxo - 2 - ethyl-2,7-dibromo-5-indanyloxy) acetic acid.—A stirred suspension of (1-oxo-2-ethyl-7-bromo-5-indanyloxy)acetic acid in acetic acid is treated over a 10-minute period with a solution of bromine in acetic acid. The reaction mixture is stirred at ambient temperature for 0.5 hour and poured into water containing sodium bisulfite (1 g.). The (1-oxo-2-ethyl-2,7-dibromo-5-indanyloxy)acetic acid is extracted from the reaction mixture with ether, and the ether solution washed with water and dried over anhydrous magnesium sulfate. Removal of the solvent yields the product as an oil.

Step C: (1-oxo - 2 - ethylidene-7-bromo-5-indanyloxy) acetic acid.—A solution of (1-oxo-2-ethyl-2,7-dibromo-5-indanyloxy)acetic acid (3.8 g., 0.01 mole) and lithium bromide (1.74 g., 0.02 mole) in dimethylformamide (20 ml.) is heated underd a nitrogen atmosphere on a steam bath for 1.5 hours. The reaction mixture is poured into ice water (100 ml.) and the (1-oxo-2-ethylidene-7-bromo-5-indanyloxy)acetic acid which separates is collected and purified by recrystallization from acetic acid.

EXAMPLE 15

(1-oxo-2-benzylidene-5,7-dichloro-6-indanyloxy) acetic acid

Step A: Ethyl (2,6-dichloro-4-formylphenoxy)acetate.—A mixture of 3,5-dichloro-4-hydroxybenzaldehyde (152 g., 0.795 mole), ethyl bromoacetate (159 g., 0.95 mole), anhydrous potassium carbonate (332 g., 2.4 moles), and dimethylformamide (600 ml.) is heated at 60° C. with stirring for one hour. The reaction mixture is cooled and poured into ice water (2500 ml.) to precipitate the solid product which is collected, washed with water and dried. The yield of ethyl (2,6-dichloro-4-formylphenoxy)acetate is 182 g. (83%), M.P. 79–82.5° C.

Step B: 3,5-dichloro-4-(ethoxycarbonylmethoxy)cinnamic acid.—A solution of ethyl (2,6-dichloro-4-formylphenoxy)acetate (182 g., 0.657 mole), malonic acid (78 g., 0.75 mole), pyridine (16.5 ml.), and ethanol (220 ml.) is refluxed overnight. It is cooled, diluted with water (150 ml.) and neutralized with concentrated hydrochloric acid (15 ml.). The solid product separates and is collected and dried. Recrystallization from acetonitrile gives 46 g. (22%) of 3,5-dichloro-4-(ethoxycarbonylmethoxy) cinnamic acid, M.P. 127.5–131.5° C.

Step C: [3,5-dichloro - 4 - (ethoxycarbonylmethoxy) phenyl]propionic acid.—A mixture of 3,5-dichloro-4-(ethoxycarbonylmethoxy)cinnamic acid (23 g., 0.072 mole), 5% platinum on carbon (3 g.), and ethyl acetate (200 ml.) is reduced in the Parr hydrogenation apparatus at room temperature. The theoretical amount of hydrogen is taken up in 20 minutes. The catalyst is filtered and the filtrate is evaporated at reduced pressure to give solid [3,5-dichloro-4 - (ethoxycarbonylmethoxy)phenyl] propionic acid, 21 g. (91%), M.P. 98–104° C. Recrystallization from a mixture of benzene and cyclohexane gives [3,5-dichloro - 4 - (ethoxycarbonylmethoxy)phenyl]propionic acid, M.P. 101–103° C.

Elemental analysis for $C_{13}H_{14}Cl_2O_5$.—Calc. (percent): C, 48.62; H, 4.39. Found (percent): C, 48.97; H, 4.19.

Step D: Ethyl (1-oxo-5,7-dichloro - 6-indanyloxy) acetate.—A solution of [3,5-dichloro-4-(ethoxycarbonylmethoxy)phenyl]propionic acid (37.6 g., 0.117 mole) in thionyl chloride (120 ml.) is refluxed for 45 minutes. The excess thionyl chloride is distilled at reduced pressure, leaving behind [3,5-dichloro-4-(ethoxycarbonylmethoxy) phenyl]propionyl chloride. It is diluted with methylene chloride (225 ml.), and anhydrous aluminum chloride (39.4 g., 0.293 mole) is added. The mixture is stirred at room temperature for 30 minutes, and then refluxed with stirring for 30 minutes. The reaction mixture is then cooled, and poured into ice water. The organic layer containing the product is separated and washed with water, sodium bicarbonate solution, and then dried over anhydrous magnesium sulfate. The methylene chloride is distilled at reduced pressure to yield solid crude product which is recrystallized from a mixture of benzene and cyclohexane. There is obtained 24 g. of ethyl (1-oxo-5, 7-dichloro-6-indanyloxy)acetate, M.P. 134.5–136.5° C.

Step E: Ethyl (1-oxo-2-benzylidene-5,7-dichloro-6-indanyloxy)acetate.—Potassium hydroxide (50 mg.) is added to a solution of ethyl (1-oxo-5,7-dichloro-6-indanyloxy)acetate (4.55 g., 0.015 mole) and benzaldehyde (2.38 g., 0.0225 mole) in ethanol (160 ml.) at 50–55° C. The reaction mixture is kept at this temperature for two hours, then allowed to cool to room temperature. The solid product that separates is collected. After one recrystallization from isopropyl alcohol-dimethylformamide, 3.8 g. (65%) of pure ethyl (1-oxo-2-benzylidene-5,7-dichloro-6-indanyloxy)acetate is obtained, M.P. 182–184° C.

Elemental analysis for $C_{20}H_{16}Cl_2O_4$.—Calc. (percent): C, 61.39; H, 4.12. Found (percent): C, 61.72; H, 4.12.

Step F: (1-oxo-2-benzylidene-5,7-dichloro-6-indanyloxy)acetic acid.—A mixture of ethyl (1-oxo-2-benzylidene-5,7-dichloro-6-indanyloxy)acetate (4.65 g., 0.012 mole), 1 N hydrochloric acid (12 ml.) and acetic (180 ml.) is heated on the steam bath for 1.5 hours, and then allowed to cool to room temperature. The solid product that separates is collected and washed with boiling isopropyl alcohol, to obtain 4.0 g. (91%) of pure (1-oxo-2-benzylidene-5,7 - dichloro - 6-indanyloxy)acetate acid, M.P. 252–255° C.

Elemental analysis for $C_{18}H_{12}Cl_2O_4$.—Calc. (percent): C, 59.52; H, 3.33. Found (percent): C, 59.25; H, 3.39.

EXAMPLE 16

Sodium (1-oxo-2-ethylidene-6,7-dichloro-5-indanyloxy)acetate

To a solution of sodium bicarbonate (1.39 g., 0.0165 mole) in water (50 ml.) is added (1-oxo-2-ethylidene-6,7-dichloro-5-indanyloxy)acetic acid (4.96 g., 0.0165 mole). The resulting solution is filtered and the solvent removed to yield sodium (1-oxo-2-ethylidene-6,7-dichloro-5-indanyloxy)acetate.

EXAMPLE 17

(1-oxo-2-ethylidene-6,7-dichloro-5-indanyloxy)acetamide

Step A: (1-oxo-2-ethylidene-6,7-dichloro-5-indanyloxy)acetyl chloride.—To a solution of (1-oxo-2-ethylidene-6,7-dichloro-5-indanyloxy)acetic acid (6.02 g., 0.02 mole) in benzene (15 ml.) is added thionyl chloride (4.76 g., 0.04 mole). The mixture is heated at reflux for one hour. The solution is evaporated to dryness under reduced pressure. The residue is dissolved in benzene and again the solvent is removed at reduced pressure to yield crude (1-oxo-2-ethylidene-6,7 - dichloro-5-indanyloxy)acetyl chloride substantially free of thionyl chloride.

Step B: (1-oxo-2-ethylidene-6,7-dichloro-5-dichlorooxy)acetamide.—The (1-oxo-2 - ethylidene-6,7-dichloro-5-indanyloxy)acetyl chloride is chilled and to it is added chilled ammonium hydroxide (conc., 50 ml.). The resulting solid is collected and dried to yield (1-oxo-2-ethylidene-6,7-dichloro-5-indanyloxy)acetamide.

EXAMPLE 18

(1-hydroxyimino-2-ethyl-6,7-dichloro-5-indanyloxy)acetic acid

To a solution of hydroxylamine hydrochloride (5.0 g., 0.072 mole) in absolute ethanol (40 ml.) and pyridine (30 ml.) is added (1-oxo-2-ethyl-6,7-dichloro-5-indanyloxy)acetic acid (5.0 g., 0.0165 mole). The reaction mixture is heated at reflux for 1.5 hours, poured into ice water (300 ml.) and acidified with concentrated hydrochloric acid. The (1-hydroxyimino-2-ethyl-6,7-dichloro-5-indanyloxy)acetic acid which separates is collected and recrystallized twice from ethanol (75 ml.) to yield 3.2 g. of substantially pure product, M.P. 202° C. (dec.).

Elmental analysis for $C_{13}H_{13}Cl_2NO_4$.—Calc. (percent): C, 49.07; H, 4.12; N, 4.40. Found (percent): C, 49.11; H, 4.44; N, 4.42.

In a manner similar to that described in Example 1 for the preparation of (1-oxo-2-ethylidene-6,7-dichloro-5-indanyloxy)acetic acid, all of the [1-oxo-2-alkylidene-indanyloxy (or thio)]alkanoic acids (I) of the invention may be obtained. Thus, by substituting the appropriate [4-(2 - alkylidenealkanoyl)phenoxy (or phenylthio)]alkanoic acid for the [2,3-dichloro-4-(2-methylenebutyryl)-phenoxy]acetic acid of Example 1, Step A, and following substantially the procedure described in Steps A, B and C of that example, all of the products of this invention may be obtained. The following equation illustrates the reaction of Example 1, Steps A, B and C and, together with Table I, infra, depict the [2-(alkylideneacyl)phenoxy (or phenylthio)]alkanoic acid intermediates and [1-oxo-2-haloindanyloxy (or thio)]alkanoic acid starting materials of the process and the [1-oxo-2-alkylidene-indanyloxy (or thio)]alkanoic acid products derived therefrom:

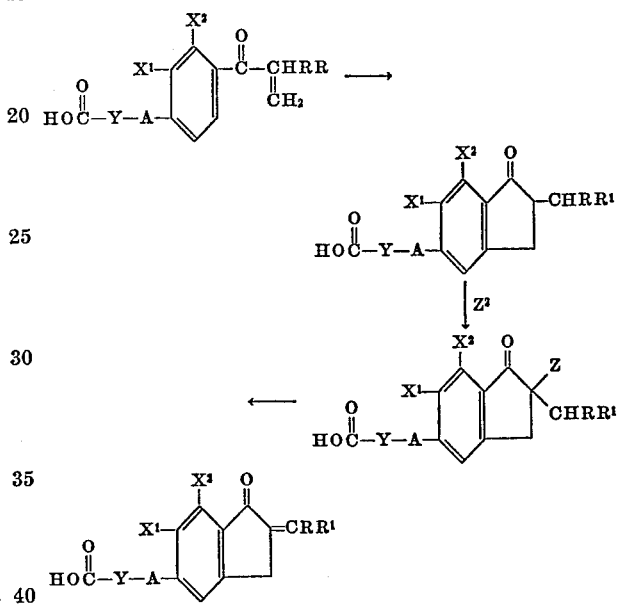

TABLE I

| Ex. | A | Y | R | R¹ | X¹ | X² | Z |
|---|---|---|---|---|---|---|---|
| 19 | O | —C(CH₃)₂— | H | CH₃— | Cl | Cl | Br |
| 20 | O | —CH₂— | H | CH₃— | H | F | Br |
| 21 | O | —CH₂— | H | CH₃CH₂— | Cl | Cl | Cl |
| 22 | O | —CH₂— | H | Cl—⟨C₆H₄⟩— | H | Cl | Br |
| 23 | O | —CH₂— | H | CH₃— | —CH₂CH₂CH₂CH₂— | | Br |
| 24 | O | —CH₂— | CH₃— | CF₃— | H | —CH₃— | Br |
| 25 | O | —(CH₂)₂— | H | H | H | Cl | Br |
| 26 | O | —CH₂— | H | CH₃— | H | —NHC(O)CH₃ | Br |
| 27 | O | —CH₂— | H | CH₃— | —CH₂CH₂CH₂— | | Br |
| 28 | O | —CH₂— | H | CH₃— | Cl | —CH₃— | Br |
| 29 | O | —CH(C₂H₅)— | H | CH₃— | H | Cl | Br |
| 30 | O | —CH₂— | H | CH₃— | Br | Cl | Cl |
| 31 | O | —CHF— | H | CH₃— | Cl | Cl | Br |
| 32 | O | —CH₂— | H | CH₃— | H | I | Br |
| 33 | O | —CH₂— | CH₃— | CH₃— | Cl | Cl | Br |
| 34 | O | —CH₂— | H | ⟨C₆H₅⟩ | H | Cl | Br |
| 35 | O | —CH(CH(CH₃)₂)— | H | CH₃— | H | Cl | Cl |
| 36 | O | —CH₂— | H | CH₃— | H | CF₃— | Br |
| 37 | S | —(CH₂)₂— | H | H | H | Cl | Br |
| 38 | S | —CH₂— | H | H | H | CH₃— | Br |
| 39 | S | —CH₂— | H | H | Cl | Cl | Br |

The novel compounds of this invention are diuretic and saluretic agents which can be administered in a wide variety of therapeutic dosages in conventional vehicles as, for example, by oral administration in the form of a tablet or by intravenous injection. Also, the daily dosage of the products may be varied over a wide range as, for example, in the form of scored tablets containing 5, 10, 25, 50, 100, 150, 250 and 500 milligrams of the active ingredient for the symptomatic adjustment of the dosage to the patient to be treated. These dosages are well below the toxic or lethal dose of the products.

A suitable unit dosage form of the products of this invention can be administered by mixing 50 milligrams of a [1-oxo-2-alkylideneindanyloxy (or thio)]alkanoic acid (I) or a suitable acid addition salt, ester or amide derivative thereof, with 149 mg. of lactose and 1 mg. of magnesium stearate and placing the 200 mg. mixture into a No. 1 gelatin capsule. Similarly, by employing more of the active ingredient and less lactose, other dosage forms can be put up in No. 1 gelatin capsules and, should it be necessary to mix more than 200 mg. of ingredients together, larger capsules may be employed. Compressed tablets, pills, or other desired unit dosages can be prepared to incorporate the compounds of this invention by conventional methods and, if desired, can be made up as elixirs or as injectable solutions by methods well known by pharmacists.

It is also within the scope of this invention to combine two or more of the compounds of this invention in a unit dosage form or to combine one or more of the compounds of this invention with other known diuretics and saluretics or with other desired therapeutic and/or nutrative agents in dosage unit form.

The following example is included to illustrate the preparation of a representative dosage form:

EXAMPLE 40

Dry-filled capsules containing 50 mg. of active ingredient per capsule

| | Mg. per capsule |
|---|---|
| (1-oxo-2-ethylidene - 6,7 - dichloro-5-indanyloxy)-acetic acid | 50 |
| Lactose | 149 |
| Magnesium stearate | 1 |
| Capsule (size No. 1) | 200 |

The (1 - oxo-2-ethylidene-6,7-dichloro-5-indanyloxy)-acetic acid is reduced to a No. 60 powder and then lactose and magnesium stearate are passed through a No. 60 bolting cloth onto the powder and the combined ingredients admixed for 10 minutes and then filled into a No. 1 dry gelatin capsule.

Similar dry-filled capsules can be prepared by replacing the active ingredient of the above example by any of the other novel compounds of this invention.

It will be apparent from the foregoing description that the [1-oxo-2-alkylideneindanyloxy (and thio)]alkanoic acid products (I) of this invention constitute a valuable class of compounds which have not been prepared heretofore. One skilled in the art will also appreciate that the processes disclosed in the above examples are merely illlustrative and are capable of a wide variation and modification without departing from the spirit of this invention.

We claim:
1. A compound having the formula:

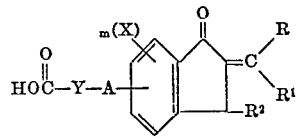

wherein A is oxygen; R is hydrogen or lower alkyl; $R^1$ is hydrogen, lower alkyl, mononuclear aryl, halo-substituted mononuclear aryl or trifluoro substituted lower alkyl; or the R and $R^1$ radicals, taken together with the carbon atom to which they are attached, may be joined to form a cycloalkylidene radical; $R^2$ is hydrogen or lower alkyl; Y is alkylene or haloalkylene; the X radicals are similar or dissimilar members selected from hydrogen, halogen, lower alkyl, trihalomethyl, and $m$ is an integer having a value of 1 to 3; and the nontoxic, pharmacologically acceptable acid addition salts and lower alkyl ester derivatives thereof.

2. A compound according to claim 1 having the formula:

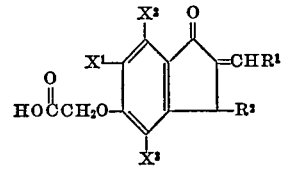

wherein $R^1$ is hydrogen or lower alkyl, $R^2$ is hydrogen or lower alkyl and $X^1$, $X^2$ and $X^3$ represent similar or dissimilar members selected from hydrogen, halogen, lower alkyl, and the nontoxic, pharmacologically acceptable acid addition salts and lower alkyl ester derivatives thereof.

3. A compound according to claim 2 wherein $R^1$ is lower alkyl, $R^2$ is hydrogen, $X^1$ and $X^2$ are halo and $X^3$ is hydrogen.

4. A compound according to claim 3 wherein $R^1$ is lower alkyl and $X^1$ and $X^2$ are chloro.

5. A compound according to claim 4 wherein $R^1$ is methyl.

6. A compound according to claim 2 wherein $R^1$ is hydrogen and $X^1$ and $X^2$ are methyl and $R^2$ is methyl.

7. A compound according to claim 2 wherein $R^2$ is hydrogen or lower alkyl, $X^1$ is hydrogen or lower alkyl, $X^2$ is lower alkyl and $X^3$ is hydrogen.

8. A compound according to claim 7 wherein $X^1$ is hydrogen, $X^2$ is methyl and $R^2$ is methyl.

9. A compound according to claim 7 wherein $X^1$ and $X^2$ are methyl and $R^2$ is hydrogen.

10. A compound according to claim 2 wherein $R^1$ is lower alkyl, $R^2$ is hydrogen, $X^1$ is halo and $X^2$ and $X^3$ are hydrogen.

11. A compound according to claim 10 wherein $R^1$ is methyl and $X^1$ is chloro.

References Cited
UNITED STATES PATENTS
2,954,400  9/1960  Shapiro ------------ 260—520

LORRAINE A. WEINBERGER, Primary Examiner

J. F. TERAPANE, Assistant Examiner

U.S. Cl. X.R.

260—473 F, 473 G, 516, 519, 521 R, 521 A, 544 M, 559 B, 590; 424—308, 317, 324